(12) United States Patent
Van De Braak et al.

(10) Patent No.: US 9,382,371 B2
(45) Date of Patent: Jul. 5, 2016

(54) METHOD FOR PRODUCING A FOAM COMPOSITE ELEMENT

(75) Inventors: Johannes Van De Braak, Hennef (DE); Rolf Roers, Odenthal (DE); Peter Haas, Haan (DE)

(73) Assignee: Covestro Deutschland AG, Leverkusen (DE)

( * ) Notice: Subject to any disclaimer, the term of this patent is extended or adjusted under 35 U.S.C. 154(b) by 425 days.

(21) Appl. No.: 13/388,409

(22) PCT Filed: Jul. 23, 2010

(86) PCT No.: PCT/EP2010/004591
§ 371 (c)(1),
(2), (4) Date: May 15, 2012

(87) PCT Pub. No.: WO2011/015299
PCT Pub. Date: Feb. 10, 2011

(65) Prior Publication Data
US 2012/0225278 A1     Sep. 6, 2012

(30) Foreign Application Priority Data

Aug. 5, 2009 (EP) ................................. 09010091
Jul. 6, 2010 (EP) .................................. 10168524

(51) Int. Cl.
| | | |
|---|---|---|
| C04B 37/00 | (2006.01) | |
| C08G 18/08 | (2006.01) | |
| B32B 5/18 | (2006.01) | |
| B32B 7/12 | (2006.01) | |
| B32B 27/40 | (2006.01) | |
| C08G 18/18 | (2006.01) | |
| C08G 18/22 | (2006.01) | |
| C08G 18/40 | (2006.01) | |
| C08G 18/42 | (2006.01) | |
| C08G 18/48 | (2006.01) | |
| C08G 18/66 | (2006.01) | |
| C08J 5/12 | (2006.01) | |
| C08J 9/14 | (2006.01) | |
| C08J 5/02 | (2006.01) | |
| C08G 101/00 | (2006.01) | |

(52) U.S. Cl.
CPC .............. *C08G 18/0876* (2013.01); *B32B 5/18* (2013.01); *B32B 7/12* (2013.01); *B32B 27/40* (2013.01); *C08G 18/1808* (2013.01); *C08G 18/1816* (2013.01); *C08G 18/225* (2013.01); *C08G 18/4018* (2013.01); *C08G 18/4202* (2013.01); *C08G 18/4211* (2013.01); *C08G 18/4216* (2013.01); *C08G 18/4261* (2013.01); *C08G 18/4833* (2013.01); *C08G 18/4837* (2013.01); *C08G 18/6685* (2013.01); *C08J 5/02* (2013.01); *C08J 5/12* (2013.01); *C08J 9/141* (2013.01); *C08G 2101/00* (2013.01); *C08G 2105/02* (2013.01); *C08J 2375/06* (2013.01); *Y10T 428/249981* (2015.04); *Y10T 428/249985* (2015.04)

(58) Field of Classification Search
USPC ........................ 156/322, 325, 327; 428/316.6
See application file for complete search history.

(56) References Cited

U.S. PATENT DOCUMENTS

| | | |
|---|---|---|
| 2005/0256261 A1 | 11/2005 | Arndt et al. |
| 2005/0257893 A1 | 11/2005 | Rub et al. |
| 2006/0099413 A1 | 5/2006 | Lu |
| 2007/0246160 A1 * | 10/2007 | Calgua et al. ............. 156/331.7 |
| 2010/0216361 A1 | 8/2010 | Bruchmann et al. |
| 2011/0056431 A1 | 3/2011 | Calgua et al. |

FOREIGN PATENT DOCUMENTS

| | | |
|---|---|---|
| DE | 10022280 A1 | 11/2001 |
| EP | 1516720 A1 | 3/2005 |
| EP | 1593438 A2 | 11/2005 |
| JP | 2005-534754 A | 11/2005 |
| JP | 2007-537310 A | 12/2007 |
| RU | 590324 | 1/1978 |
| RU | 94039961 A | 8/1996 |
| RU | 2357806 C2 | 6/2009 |
| WO | WO-2006/029786 A1 | 3/2006 |
| WO | WO-2009/047269 A2 | 4/2009 |
| WO | WO-2009-047269 A2 | 4/2009 |

* cited by examiner

*Primary Examiner* — Joseph S Del Sole
*Assistant Examiner* — John Robitaille
(74) *Attorney, Agent, or Firm* — Drinker Biddle & Reath LLP

(57) ABSTRACT

The invention relates to a process for the production of a foam composite element, comprising the steps of providing a facing, applying adhesion promoter, and applying a foam layer comprising polyurethane and/or polyisocyanurate to the adhesion promoter, characterized in that the adhesion promoter consists of at least one compound selected from the group consisting of polyether polyol (B.1), polymer polyol (B.2), polyurea dispersion (B.3), polyester polyol (B.4) and PIPA polyol (B.5). The invention relates further to the use of at least one compound selected from the group consisting of polyether polyol, polymer polyol and polyurea dispersion as adhesion promoter in the production of foam composite elements, as well as to foam composite elements produced by the process according to the invention.

11 Claims, No Drawings

METHOD FOR PRODUCING A FOAM COMPOSITE ELEMENT

RELATED APPLICATIONS

This application is a national stage application (under 35 U.S.C. §371) of PCT/EP2010/004591, filed Jul. 23, 2010, which claims benefit of European Application No. 09010091.8, filed Aug. 5, 2009, and European Application No. 10168524.6, filed Jul. 6, 2010.

The invention relates to a process for the production of a foam composite element, comprising the steps of providing a facing, applying adhesion promoter to the facing, and applying a foam layer comprising polyurethane and/or polyisocyanurate to the adhesion promoter, characterised in that the adhesion promoter consists of at least one compound selected from the group consisting of polyether polyol, polymer polyol, polyurea dispersion, polyester polyol and PIPA polyol. The invention relates further to the use of at least one compound selected from the group consisting of polyether polyol, polymer polyol and polyurea dispersion as adhesion promoter in the production of foam composite elements, and to foam composite elements obtained by the process according to the invention.

For the continuous production of metal sandwich elements based on rigid polyurethane foams, that is to say both rigid polyurethane and rigid polyisocyanurate foams, the adhesion of the metallic facing to the foam is important, in particular when the foam is a polyisocyanurate foam. Two-component polyurethane adhesion promoter systems are established on the market. The adhesion is in principle markedly improved by the use of such two-component adhesion promoter systems, which for the manufacturers of finished components means an improved product. In particular, the long-term risks of adhesion failure are considerably reduced.

However, difficulties with adequate homogenisation of the adhesion promoter components can occur during the processing of such two-component adhesion promoter systems. Inadequate homogenisation can mean a high risk in terms of the long-term bond properties of the metal composite elements in that failure of the adhesion of the facing to the foam can occur in the case of fluctuating temperatures. Furthermore, processing of a two-component adhesion promoter system can mean relatively high rejections at the beginning of a production phase.

In order to avoid the risk of inadequate bond properties owing to inadequate homogenisation of the two adhesion promoter components, one-component solutions are provided. For example, EP 1 516 720 A1 discloses the use of a polyurethane adhesion promoter for improving the adhesion between the layers of a composite element containing a polyisocyanurate foam and facings, as well as the composite elements as such and a process for their production.

EP 1 593 438 A2 discloses a device and a process for the production of sandwich composite elements. The device consists at least of two feed devices for facings, to which there are connected, one behind the other, an application device for an adhesion promoter, an application device for a core layer, a conveyor device and a deflection device. The application device for the adhesion promoter consists at least of a feed line for the adhesion promoter, a rotary plate having at least one lateral outlet opening, and a drive for the rotary plate. There can be used as adhesion promoter one-component systems, for example based on polyurethane, such as prepolymers containing NCO groups. Further possible one-component systems are based on polychloroprene, epoxide or polyvinyl acetate. The adhesion promoter can also be composed of a multi-component system, preferably of a two-component system. Preferred two-component systems are polyurethane systems.

A constant object is to improve the adhesion between the foam and the facings in foam composite elements. Consequently, there is a need for alternative and improved processes for the production of such composite elements, which in particular permit improved adhesion between the foam and the facings in foam composite elements and at the same time the occurrence of not more than minor faults at the foam/facing interface.

The invention therefore provides a process for the production of a foam composite element, comprising the steps:
A) providing a facing;
B) applying adhesion promoter to the facing, and
C) applying a foam layer comprising polyurethane and/or polyisocyanurate to the polyol compound, characterised in that the adhesion promoter consists of at least one compound selected from the group consisting of polyether polyol (B.1), polymer polyol (B.2), polyurea dispersion (B.3), polyester polyol (B.4) and PIPA polyol (B.5).

It has been found that by using polyether polyol (B.1), polymer polyol (B.2), polyurea dispersion (B.3), polyester polyol (B.4) and/or PIPA polyol (B.5) as adhesion promoter, the adhesion of the foam to the facing could be improved as compared with known systems. According to the present invention, therefore, no further adhesion promoter is used in addition to the adhesion promoter according to the invention, which consists of at least one compound selected from the group consisting of polyether polyol (B.1), polymer polyol (B.2), polyurea dispersion (B.3), polyester polyol (B.4) and PIPA polyol (B.5). By using only the adhesion promoters according to the invention it is possible in particular to avoid problems which are avoided on inadequately mixed two-component adhesion promoter systems. Inadequately mixed adhesion promoter systems would lead to blister formation or to predetermined breaking points in the composite material.

Advantageously, the sole use of polyol compounds also enables the whole surface of the facing to be wetted.

The foam composite elements produced according to the invention are suitable in particular as heat insulating elements.

Step A) of the process according to the invention relates to the provision of a facing. This can take place in continuous production plants, for example by unrolling a rolled-up facing from a roll. The nature of the facing is not specified further for the present, it being possible preferably to use the materials conventionally used for facings in the heat insulation sector. The thickness of the facing can be, for example, from ≥200 μm to ≤5 mm, preferably from ≥300 μm to ≤2 mm and particularly preferably from ≥400 μm to ≤1 mm.

In step B), the adhesion promoter according to the invention is applied to a facing which has been provided. Application can be carried out using conventional techniques such as, for example, spraying or roller application. The adhesion promoter according to the invention consists of at least one compound selected from the group consisting of polyether polyol (B.1), polymer polyol (B.2), polyurea dispersion (B.3), polyester polyol (B.4) and PIPA polyol (B.5). Preferably, the adhesion promoter according to the invention consists of at least one compound selected from the group consisting of polyether polyol (B.1) and polymer polyol (B.2). Most preferably, a mixture of polyether polyol (B.1) and polymer polyol (B.2), for example in the ratio B.1:B.2=from 3:1 to 1:3, is used as adhesion promoter.

Preferably, the adhesion promoter according to the invention has a hydroxyl functionality of from 1 to 8, particularly preferably from 2 to 4, most particularly preferably from 2 to 3.

Preferably, the adhesion promoter according to the invention has a hydroxyl number in the range from 15 to 500, particularly preferably from 20 to 200, most particularly preferably from 20 to 60.

Preferably, the adhesion promoter according to the invention has a viscosity, measured according to DIN 53015 at a temperature of 25° C., in the range from 200 to 30,000 mPa·s, particularly preferably in the range from 200 to 20,000 mPa·s, most particularly preferably in the range from 200 to 10,000 mPa·s.

Polyether polyols (B.1) prepared by a known process are used as adhesion promoter. This is carried out, for example, by anionic polymerisation with alkali hydroxides, such as sodium or potassium hydroxide, or with alkali alcoholates, such as sodium methylate, sodium or potassium methylate or potassium isopropylate, as catalysts and with the addition of at least one starter molecule which contains from 2 to 8 reactive hydrogen atoms, preferably from 2 to 3 reactive hydrogen atoms, bonded therein, for the preparation of polyoxyalkylene polyols, or by cationic polymerisation with Lewis acids, such as antimony pentachloride, boron trifluoride etherate, etc. or bentonite as catalysts from one or more alkylene oxides having from 2 to 4 carbon atoms in the alkylene moiety. Within the scope of the present invention, the polyether polyols B.1 do not contain a filler.

Alkylene oxides which are suitable according to the invention are, for example, ethylene oxide, 1,2-propylene oxide, tetrahydrofuran, 1,3-propylene oxide, 1,2- and 2,3-butylene oxide, and preferably ethylene oxide and 1,2-propylene oxide. The alkylene oxides can be used on their own, alternately in succession, or in the form of mixtures.

As starter molecules there are preferably used compounds selected from the group consisting of water, organic dicarboxylic acids, such as succinic acid, adipic acid, phthalic acid and terephthalic acid, aliphatic and aromatic, optionally N-mono-, N,N- and N,N'-dialkyl-substituted diamines having from 1 to 4 carbon atoms in the alkyl moiety, such as optionally mono- and di-alkylene-substituted ethylenediamine, diethylenetriamine, triethylenetetramine, 1,2-propyleneamine, 1,3- and 1,4-butylenediamine, 1,2-, 1,3-, 1,4-, 1,5- and 1,6-hexamethylenediamine, phenylenediamine, 2,3-, 3,4-, 2,4- and 2,6-toluoylenediamine and 4,4'-, 2,4'- and 2,2'-diaminodiphenylmethane, alkanolamine, such as, for example, ethanolamine, N-methyl- and N-ethyl-ethanolamine, dialkanolamines, such as, for example, diethanolamine, N-methyl- and N-ethyl-diethanolamine, and trialkanolamines, such as, for example, triethanolamine, and ammonia. Preference is given to the use of polyhydric, in particular di- to octa-hydric, alcohols and/or alkylene glycols, such as, for example, ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, and mixtures of at least two polyhydric alcohols.

As polyether polyols there can also be used copolymers which can be prepared by addition of alkylene oxides and a further monomer (such as, for example, anhydrides, carbon dioxide) to starter molecules, such as, for example, polyether carbonate polyols. The preparation of polyether carbonate polyols by catalytic addition of alkylene oxides and carbon dioxide to H-functional starter molecules is described, for example, in Inoue et al., Copolymerization of Carbon Dioxide and Epoxide with Organometallic Compounds; Die Makromolekulare Chemie 130, 210-220, 1969.

The polyether polyols are preferably polyoxypropylene and polyoxypropylene-polyoxyethylene polyols. The polyether polyols preferably have a functionality of from 2 to 8 and particularly preferably hydroxyl numbers from 20 to 500.

The polyether polyols (B.1) can be used on their own or in the form of mixtures with further polyether polyols or in the form of mixtures with further adhesion promoters B.2 to B.5. Preferably, a mixture of polyether polyol (B.1) with polymer polyol (B.2) and/or polyurea dispersion (B.3) is used as the adhesion promoter.

Preferably, the polyether polyol has a viscosity, measured according to DIN 53015 at a temperature of 25° C., in the range from 200 to 30,000 mPa·s, particularly preferably in the range from 200 to 20,000 mPa·s, most particularly preferably in the range from 200 to 10,000 mPa·s.

Polymer polyols (B.2) are also used according to the invention as the adhesion promoter. Polymer polyols are frequently also referred to as graft polyols. These polymer polyols are conventionally prepared by radical polymerisation of suitable olefinic monomers, for example styrene, acrylonitrile, acrylates and/or acrylamide, in a polyetherol serving as graft base ("carrier polyetherol"). The side chains generally form by transferring the radicals from growing polymer chains to polyether polyols. The polymer polyol contains, in addition to the graft copolymer, predominantly the homopolymers of the olefins, dispersed in unchanged polyetherol.

In a preferred embodiment there are prepared as monomers acrylonitrile, styrene, in particular styrene and acrylonitrile in a ratio of from 1:1 to 3:1, as well as optionally in the presence of further monomers, of a macromer, of a moderator and using a radical initiator, mostly azo or peroxide compounds, in a polyetherol or polyesterol as continuous phase.

There come into consideration as carrier polyetherols usually compounds having a hydroxyl group functionality of from 2 to 8, preferably from 2 to 3, a hydroxyl number from 20 to 100 mg KOH/g, preferably from 25 to 70 mg KOH/g, prepared by anionic, cationic or neutral polymerisation (DMC) of alkylene oxides, preferably ethylene and/or propylene oxide.

Macromers, also referred to as stabilisers, are linear or branched polyols having number-average molecular weights of up to 2000 g/mol, which contain at least one terminal, reactive, olefinic unsaturated group. The ethylenically unsaturated group can be introduced into an already existing polyol by reaction with anhydrides (maleic anhydride, fumaric acid), acrylate and methacrylate derivatives and isocyanate derivatives, such as 3-isopropenyl-1,1-dimethylbenzyl isocyanates, isocyanatoethyl methacrylates.

During the radical polymerisation, the macromers are incorporated into the copolymer chain. As a result, block copolymers having a polyether block and a polyacrylonitrile-styrene block form, which act as phase compatibilizer in the interface between the continuous phase and the disperse phase and suppress agglomeration of the polymer polyol particles. The amount of macromers is usually from 1 to 15 wt. %, based on the total weight of the monomers used to prepare the polymer polyol.

Moderators, also referred to as chain-transfer agents, are usually used in the preparation of polymer polyols (B.2). The moderators reduce the molecular weight of the copolymers that are forming by chain transfer of the growing radical, as a result of which crosslinking between the polymer molecules is reduced, which influences the viscosity and the dispersion stability as well as the filterability of the polymer polyols. The amount of moderators is usually from 0.5 to 25 wt. %, based on the total weight of the monomers used to prepare the polymer polyol. Moderators which are conventionally used in the preparation of polymer polyols are alcohols, such as 1-butanol, 2-butanol, isopropanol, ethanol, methanol, cyclohexane, toluene, mercaptans, such as ethanethiol, 1-heptanethiol, 2-octanethiol, 1-dodecanethiol, thiophenol, 2-ethylhexyl thioglycolates, methyl thioglycolates, cyclohexylmercaptan and enol ether compounds, morpholines and α-(benzoyloxy) styrene.

For initiating the radical polymerisation there are conventionally used peroxide or azo compounds, such as dibenzoyl peroxide, lauroyl peroxide, tert-amyl peroxy-2-ethylhexanoate, di-tert-butyl peroxide, diisopropyl peroxide carbonate, tert-butyl peroxy-2-ethylhexanoate, tert-butyl perpivalate, tert-butyl perneodecanoate, tert-butyl perbenzoate, tert-butyl percrotonate, tert-butyl perisobutyrate, tert-butyl peroxy-1-methylpropanoate, tert-butyl peroxy-2-ethylpentanoate, tert-butyl peroxyoctanoate and di-tert-butyl perphthalate, 2,2'-azobis(2,4-dimethyl-valeronitrile), 2,2'-azobisisobutyronitrile (AIBN), dimethyl 2,2'-azobisisobutyrate, 2,2'-azobis(2-methylbutyronitrile) (AMBN), 1,1'-azobis(1-cyclohexanecarbonitrile). The amount of initiators is conventionally from 0.1 to 6 wt. %, based on the total weight of the monomers used to prepare the polymer polyol.

On account of the rate of reaction of the monomers and the half-life of the initiators, the radical polymerisation to prepare polymer polyols is conventionally carried out at temperatures from 70 to 150° C. and a pressure of up to 20 bar. Preferred reaction conditions for the preparation of polymer polyols are temperatures from 80 to 140° C. at a pressure from atmospheric pressure to 15 bar.

Preferably, the polymer polyols (B.2) have a filler content of from 1 to 45 wt. %, particularly preferably from 5 to 30 wt. %, most particularly preferably from 15 to 25 wt. %.

Preferably, the polymer polyol has a viscosity, measured according to DIN 53015 at a temperature of 25° C., in the range from 200 to 30,000 mPa·s, particularly preferably in the range from 200 to 20,000 mPa·s, most particularly preferably in the range from 200 to 10,000 mPa·s.

Preferably, the polymer polyol has a content of primary hydroxyl groups of from ≥50 mol % to ≤100 mol %.

The polymer polyol component can be prepared, for example, by addition of propylene oxide and ethylene oxide to glycerol as starter molecule. The amount of propylene oxide can advantageously be from ≥80 wt. % to ≤95 wt. % and the amount of ethylene oxide can advantageously be from ≥5 wt. % to ≤20 wt. %. The content of primary hydroxyl groups in the polymer polyol can particularly preferably also be in a range from ≥60 mol % to ≤80 mol %.

Polyurea dispersions (B.3) are also used according to the invention as the adhesion promoter. Polyurea dispersions within the scope of the invention are filler-containing polyether polyols, the filler being a reaction product of a di- and/or poly-isocyanate with diamines and/or hydrazine. Preferably, the polyurea dispersion is obtained by reaction of diamines and/or hydrazine with di- and/or poly-isocyanates in the presence of a polyether polyol according to component B.1 (PHD dispersions).

The polyurea dispersions according to component B.3 (PHD dispersion) are prepared, for example, by in situ polymerisation of a di- and/or poly-isocyanate or of an isocyanate mixture with a diamine and/or hydrazine in a polyether polyol according to component B.1. Preferably, the PHD dispersion is prepared by reaction of an isocyanate mixture comprising from 75 to 85 wt. % 2,4-toluene diisocyanate (2,4-TDI) and from 15 to 25 wt. % 2,6-toluene diisocyanate (2,6-TDI) with a diamine and/or hydrazine in a polyether polyol according to B.1, preferably a polyether polyol prepared by alkoxylation of a trifunctional starter (such as, for example, glycerol and/or trimethylolpropane). Processes for the preparation of PHD dispersions are described, for example, in U.S. Pat. No. 4,089,835 and U.S. Pat. No. 4,260,530.

The polyurea dispersions preferably have a filler content of from 1 to 45 wt. %, particularly preferably from 5 to 30 wt. %, most particularly preferably from 10 to 25 wt. %. Polyester polyols (B.4) are used as the adhesion promoter. Polyester polyols (B.4) are prepared in particular from organic dicarboxylic acids having from 2 to 12 carbon atoms, preferably aliphatic dicarboxylic acids having from 4 to 6 carbon atoms, and polyhydric alcohols, preferably alkanediols having from 2 to 12 carbon atoms, preferably from 2 to 6 carbon atoms, dialkylene glycols and/or alkanetriols having from 3 to 6 carbon atoms. Dicarboxylic acids used according to the invention are preferably selected from the group consisting of succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either on their own or in a mixture. Instead of the dicarboxylic acids it is also possible to use the corresponding carboxylic acid derivatives, such as, for example, dicarboxylic acid esters of alcohols having from 1 to 4 carbon atoms or dicarboxylic acid anhydrides. As di- and poly-hydric alcohols, in particular alkanediols and dialkylene glycols, there can be used according to the invention compounds from the group consisting of ethanediol, diethylene glycol, 1,2- and 1,3-propanediol, dipropylene glycol, 1,4-butanediol, 1,5-pentanediol and 1,6-hexanediol.

Polyester polyols from lactones, for example ε-caprolactone or hydroxycarboxylic acids, for example ω-hydroxycaproic acid, can also be used.

For the preparation of the polyester polyols, the organic, for example aromatic and preferably aliphatic dicarboxylic acids and/or their derivatives and the polyhydric alcohols and/or alkylene glycols can be polymerised without a catalyst or, preferably, in the presence of transesterification catalysts, advantageously in an atmosphere of inert gases, such as, for example, nitrogen, helium, argon, etc., in the melt at temperatures of from 150 to 250° C., preferably from 180 to 220° C., optionally under reduced pressure, to the desired acid number, which is advantageously less than 10, preferably less than 2.

According to a preferred embodiment, the esterification mixture is polycondensed at the above-mentioned temperatures to an acid number of from 80 to 30, preferably from 40 to 30, under normal pressure and then under a pressure of less than 500 mbar, preferably from 50 to 150 mbar. There come into consideration as transesterification catalysts, for example, iron, cadmium, cobalt, lead, zinc, antimony, magnesium, titanium and tin catalysts in the form of metals, metal oxides or metal salts. The polycondensation can, however, also be carried out in liquid phase in the presence of diluents and/or entrainers, such as, for example, benzene, toluene, xylene or chlorobenzene, for azeotropic distillation of the water of condensation.

For the preparation of the polyester polyols, the organic dicarboxylic acids and/or their derivatives and the polyhydric alcohols are advantageously polycondensed in a molar ratio of 1:1 to 1.8, preferably 1:1.05 to 1.2. The resulting polyester polyols preferably have a functionality of from 2 to 4, in particular from 2 to 3, and a hydroxyl number from 20 to 140, preferably from 20 to 40.

Preferably, the polyester polyol has a viscosity, measured according to DIN 53015 at a temperature of 25° C., in the range from 200 to 30,000 mPa·s, particularly preferably in the range from 200 to 20,000 mPa·s, most particularly preferably in the range from 200 to 10,000 mPa·s.

PIPA polyols (B.5) are also used as adhesion promoter. These are urethane-group-containing dispersions which are obtained by reaction of alkanolamines and diisocyanates in polyether polyols according to B.1. The filler-containing polyether polyols according to component B.5 are preferably PIPA (polyisocyanate polyaddition with alkanolamines)-modified polyether polyols, the polyether polyol having a functionality of from 2.5 to 4 and a molecular weight of from 500 to 18,000.

The thickness of the layer of adhesion promoter can be, for example, from ≥10 μm to ≤500 μm, preferably from ≥20 μm to ≤200 μm and particularly preferably from ≥25 μm to ≤100 μm.

The use of components B.1, B.2, B.3, B.4 and/or B.5 as adhesion promoter allows interruptions in the production of foam composite elements without a larger amount of rejects being produced as a result. While conventional adhesion promoters based on 2-component systems are completely reacted after a short time, components B.1, B.2, B.3, B.4 and/or B.5 as adhesion promoter are not reactive in themselves or with themselves. Advantageously, the production of foam composite elements can therefore be stopped, if problems occur in the production process, without large amounts of material having to be discarded.

In step C), a foam layer comprising polyurethane and/or polyisocyanurate is applied to the layer of adhesion promoter (components B.1, B.2, B.3, B.4 and/or B.5). This can also be carried out in a continuous production plant. This layer can be present, for example, in a thickness from ≥2 cm to ≤28 cm, from ≥3 cm to ≤26 cm and preferably from ≥4 cm to ≤24 cm. It is possible to mix the reaction components in a mixing head immediately prior to application and to apply the reaction mixture that yields the foam directly to the layer of the adhesion promoter. The use of foams comprising polyisocyanurate or predominantly polyisocyanurate in particular is advantageous because they have good flame retardant properties even with a reduced content of flame-retarding agents.

The conventional aliphatic, cycloaliphatic and in particular aromatic polyisocyanates are used for the production of the foam layer. Preference is given to the use of toluene diisocyanate (TDI), diphenylmethane diisocyanate (MDI) and, in particular, mixtures of diphenylmethane diisocyanate and polyphenylenepolymethylene polyisocyanates (crude MDI). Suitable compounds having at least two hydrogen atoms reactive towards isocyanate groups are generally those which carry in the molecule two or more reactive groups selected from OH groups, SH groups, NH groups, $NH_2$ groups and CH-acidic groups such as β-diketo groups. Preference is given to the use of polyetherols and/or polyesterols, with polyether polyols being preferred. The hydroxyl number of the polyetherols and/or polyesterols used is preferably from 25 to 800 mg KOH/g, the molar masses are generally greater than 400 g/mol.

It is possible for the foam layer, which is generally also to be understood as meaning the foam of the foam layer, to have a closed cell content of from ≥85% to ≤100%, preferably from ≥90% to ≤100%, which can be determined according to DIN ISO 4590. Furthermore, the foam layer can have a mean cell diameter according to ASTM 3576-77 of from ≥10 μm to ≤600 μm, preferably from ≥50 μm to ≤400 μm.

Of course, it is possible in the process according to the invention, after step C), to apply a further layer of the adhesion promoter as in step B) to the foam layer and then a further facing as described in step A). A foam composite element provided with a facing on both sides is then obtained. The process can be carried out in a conventional twin-belt installation, for example.

In an embodiment of the present invention, the material of the facing comprises aluminium, steel, bitumen, paper, mineral nonwovens, nonwovens comprising organic fibres, plastics sheets, plastics films and/or wood plates. It is particularly preferred for the facing to be aluminium metal or steel. The facing, in particular the aluminium or steel, can be coated. The adhesion promoters used according to the invention result in particularly good adhesion in particular between a polyisocyanurate foam and an aluminium facing or a steel facing.

In a further embodiment of the process according to the invention, the adhesion promoter is applied to the facing in an amount of from ≥20 $g/m^2$ to ≤50 $g/m^2$. This represents a reduction in the required amount of adhesion promoter as compared with known processes. The amount of adhesion promoter applied to the facing can also be within a range from ≥25 $g/m^2$ to ≤35 $g/m^2$. Overall, a saving in terms of material (less adhesion promoter) is accordingly obtained.

In a further embodiment of the process according to the invention, the facing is heated to a temperature of from ≥20° C. to ≤70° C., particularly preferably from ≥40° C. to ≤60° C., after application of the adhesion promoter and of the reaction mixture for producing the foam layer. The reaction of the adhesion promoter with other layers is accelerated by heating of the facing, and a firmer bond is obtained overall. The facing can also particularly preferably be heated to a temperature of from ≥45° C. to ≤55° C. before the adhesion promoter is applied.

In a further embodiment of the process according to the invention, the foam layer is obtainable from the reaction of a polyisocyanate and at least one compound selected from the group consisting of reaction mixtures comprising polyester polyols and polyether polyols, the molar ratio of isocyanate groups to isocyanate-reactive groups (such as, for example, hydroxyl groups) in the reaction mixture before the start of the reaction being from ≥1:1 to ≤5:1. This situation is generally expressed by the index. The index gives the percentage ratio of the amount of isocyanate actually used to the stoichiometric, i.e. calculated, amount of isocyanate (NCO) groups:

$$\text{Index} = [(\text{Amount of isocyanate used}) : (\text{Calculated amount of isocyanate})] \cdot 100 \quad (I)$$

In other words, the index of this reaction mixture is from 100 to 500. The index can also be from ≥150 to ≤350 or from ≥200 to ≤300. With such indices there are predominantly obtained polyisocyanurate foams which, as already mentioned, contain smaller amounts of flame-retarding agents and can nevertheless, owing to the process according to the invention, be thinly bonded to facings, in particular aluminium facings. The polyisocyanurate foam is preferably a rigid foam, defined on the basis of its compressive strength at 10% compression or from ≥10 kPa to ≤300 kPa. The compressive strength or compressive resistance can be determined according to DIN 53421/DIN EN ISO 604. It can also be within a range from ≥150 kPa to ≤250 kPa or from ≥180 kPa to ≤280 kPa.

In the process according to the invention, wherein the foam layer is obtainable from the reaction of at least one polyisocyanate and a reaction mixture containing at least polyester polyol and optionally polyether polyol with an index of from ≥150 to ≤350, particularly preferably from ≥200 to ≤300, there is preferably used as adhesion promoter a mixture of polyether polyol (B.1) with polymer polyol (B.2) and/or polyurea dispersion (B.3), preferably in a ratio of B.1 to B.2 and/or B.3 of from 3:1 to 1:3, the solids content of the adhesion promoter mixture preferably being from 10 to 30 wt. %.

In a further embodiment of the process according to the invention, the apparent density of the foam layer is from ≥25 g/l to ≥48 g/l, particularly preferably from ≥35 g/l to ≤45 g/l. It can be determined in accordance with standard ISO 845. It is also possible for the apparent density to be most particularly preferably from ≥37 g/l to ≤42 g/l, yet more preferably from ≥39 g/l to ≤40 g/l. Irrespective thereof, it is further also possible for the foam layer, which is generally to be understood as meaning also the foam of the foam layer, to have a closed cell content of from ≥85% to ≤100%, preferably from ≥90% to ≤100%, which can be determined according to DIN ISO 4590. The foam layer can further have a mean cell diameter according to ASTM 3576-77 of from ≥10 μm to ≤600 μm, preferably from ≥50 μm to ≤400 μm.

The present invention relates further to the use of at least one compound selected from the group consisting of polyether polyol (B.1), polymer polyol (B.2) and polyurea dispersion (B.3) as adhesion promoter in the production of foam composite elements. Details of the polyether polyols (B.1), polymer polyols (B.2) and polyurea dispersions (B.3) used as adhesion promoter have already been described above, so that reference can be made thereto in their entirety.

The present invention further provides a foam composite element obtained by a process according to the invention, wherein the adhesion between the facing and the foam layer is from ≥0.20 N/mm² to ≤1.00 N/mm², particularly preferably from ≥0.20 N/mm² to ≤0.50 N/mm², most particularly preferably from ≥0.20 N/mm² to ≤0.30 N/mm². In particular, the foam layer can be a polyisocyanurate foam layer. The adhesion is advantageously measured in accordance with DIN 53292. In practice, a lower limit of 0.20 N/mm² is regarded as being particularly advantageous for sufficient adhesion.

The invention accordingly also provides a foam composite element containing the layers
(α) a facing,
(β) an adhesion promoter consisting of at least one compound from the group consisting of polyether polyol (B.1), polymer polyol (B.2), polyurea dispersion (B.3), polyester polyol (B.4) and PIPA polyol (B.5), preferably consisting of at least one compound from the group consisting of polyether polyol (B.1), polymer polyol (B.2), polyurea dispersion (B.3), and
(γ) a foam layer comprising polyurethane and/or polyisocyanurate,
wherein the layers are arranged in the sequence (α)-(β)-(γ), preferably in the sequence (α)-(β)-(γ)-(β)-(α).

EXAMPLES

The adhesion was tested in accordance with standard DIN 53292. The procedure differs from the tensile test perpendicularly to the plane of the facing according to DIN 53292-82 by the different sample thickness and the number of facings. In the test according to DIN 53292-82, the total thickness of the facings is taken. The weakest region of the sample as a whole thereby determines the fracture site. By contrast, the adhesion test in the modification described here permits side-related assessment of the adhesion. A sample is therefore taken by cutting a composite element perpendicularly to the facings. Square samples having a side length of 50 mm and a height of 15 mm (including the facing) are used in the measurement.

In order to determine faults at the foam/facing interface ("blister formation"), the metal composite element was tempered for 1 hour at 105° C. The upper and/or lower facing of the metal composite element was then removed. It was checked whether collapsed cavities occur in addition to the regular cell structure of the rigid polyurethane foam.

No faults: No collapsed cavities.
Minor faults: Number of collapsed cavities: from 1 to less than 5, each having a diameter of less than 5 mm
Moderate faults: Number of collapsed cavities from 5 to less than 10 and/or diameter of the collapsed cavities from 5 to 10 mm
Major faults: Number of collapsed cavities at least 10 and/or diameter of the collapsed cavities greater than 10 mm.

The following adhesion promoters were used in the examples:
Adhesion promoter AP A: Polyurea dispersion based on a polyether polyol of glycerol, ethylene oxide and propylene oxide, having a functionality of 3 and a hydroxyl number of 28 mg KOH/g.
Adhesion promoter AP B: Polymer polyol based on a polyether polyol of glycerol, ethylene oxide and propylene oxide, having a functionality of 3 and a hydroxyl number of 28 mg KOH/g, containing 20 wt. % of a filler based on SAN (60/40).
Adhesion promoter AP C: Polymer polyol based on a polyether polyol of glycerol, ethylene oxide and propylene oxide, having a functionality of 3 and a hydroxyl number of 20 mg KOH/g, containing 43 wt. % of a filler based on SAN (60/40).
Adhesion promoter AP D: A mixture consisting of 50 wt. % of adhesion promoter AP C and 50 wt. % of a polyether polyol of glycerol, ethylene oxide and propylene oxide having a functionality of 3, and a hydroxyl number of 28 mg KOH/g.
Adhesion promoter AP E: Polyether polyol of glycerol, ethylene oxide and propylene oxide having a functionality of 3 and a hydroxyl number of 28 mg KOH/g.

Examples 1 to 6

Foam System 1 a-component:
39 parts by weight of polyether ester polyol 1 (prepared by reacting phthalic anhydride, diethylene glycol and ethylene glycol in a first stage to give a polyester polyol, which was chain-extended with ethylene oxide in a second stage. The resulting polyether ester polyol 1 had a functionality of 2 and a hydroxyl number of 310 mg KOH/g);
15.7 parts by weight of polyether polyol 1 (prepared from propylene glycol as starter compound and propylene oxide and ethylene oxide; the resulting polyether polyol 1 had a functionality of 2 and a hydroxyl number of 28 mg KOH/g);
12 parts by weight of polyether polyol 2 (prepared from sugar and ethylene glycol as starter compounds and propylene oxide; the resulting polyether polyol 2 had a functionality of 3 and a hydroxyl number of 380 mg KOH/g);
25 parts by weight of flame-retarding agent 1 (trischloroisopropyl phosphate, TCPP);
5 parts by weight of stabiliser 1 (silicone-containing stabiliser);
2.5 parts by weight of polyester polyol 1 (prepared from phthalic anhydride and diethylene glycol; the resulting polyester polyol 1 had a hydroxyl number of 795 mg KOH/g);
0.8 part by weight of water.
b-component:
Desmodur 44V70L (polymeric MDI, obtainable from Bayer MaterialScience AG).

The a- and b-components were mixed together in the ratio a:b=100:200. For the production of a metal composite element having a thickness of 200 mm, 13 parts by weight of pentane were also added as foaming agent, as well as 3 parts by weight of the trimerisation catalyst potassium acetate and 0.6 part by weight of a mixture of 76 wt. % cyclohexyldimethylamine and 24 wt. % pentamethyltriethylenediamine, the parts by weight being based on 100 parts by weight of component A.

The adhesion promoter composition was applied to a steel sheet, preheated to 40° C., using a device as described in EP 1 593 438 A2. The amount of adhesion promoter used is shown in Table 1. A polyisocyanurate foam having the composition mentioned above according to foam system 1 was then applied thereto.

TABLE 1

Tests with foam system 1

| Example | Adhesion promoter | Amount of adhesion promoter applied [g/m²] | Adhesion [N/mm²] | Blister formation |
|---|---|---|---|---|
| 1 (comp.) | without adhesion promoter | — | 0.13 | none |
| 2 | AP A | 32 | 0.25 | none |
| 3 | AP B | 39 | 0.16 | none |
| 4 | AP C | 32 | 0.19 | pronounced |
| 5 | AP D | 45 | 0.27 | slight |
| 6 | AP E | 34 | 0.18 | slight | comp. = comparison example

In the tests of Examples 2 to 6, it is shown that an improvement in the adhesion can be achieved by using polyether polyols as adhesion promoter.

Examples 7 to 10

Foam System 2 a-component:
63.8 parts by weight of a polyester polyol 2 (prepared from phthalic anhydride, adipic acid, monoethylene glycol and diethylene glycol; the resulting polyester polyol 2 had a hydroxyl number of 240 mg KOH/g);
5 parts by weight of a polyether polyol 2 (prepared from trimethylolpropane as starter compound and ethylene oxide; the resulting polyether polyol 2 had a functionality of 3 and a OH number of 240 mg KOH/g);
2.2 parts by weight of a polyester polyol 1 (prepared from phthalic anhydride and diethylene glycol; the resulting polyester polyol 2 had a hydroxyl number of 795 mg KOH/g);
20 parts by weight of flame-retarding agent TCPP;
5 parts by weight of flame-retarding agent TEP;
4 parts by weight of silicone-containing stabiliser.
b-component:
Desmodur 44V70L (polymeric MDI, obtainable from Bayer MaterialScience AG).

The a- and b-components were mixed together in the ratio a:b=100:160. For the production of a metal composite element having a thickness of 40 mm, 15 parts by weight of pentane were also added as foaming agent, as well as 5 parts by weight of the trimerisation catalyst potassium octoate, the parts by weight being based on 100 parts by weight of component A.

The adhesion promoter composition was applied to a steel sheet, preheated to 40° C., using a spray gun. The amount of adhesion promoter used is shown in Table 2. A polyisocyanurate foam having the composition mentioned above according to foam system 2 was then applied thereto.

TABLE 2

Adhesion tests with foam system 2.

| Example | Adhesion promoter | Amount of adhesion promoter applied [g/m²] | Adhesion [N/mm²] | Blister formation |
|---|---|---|---|---|
| 7 (comp.) | without adhesion promoter | — | 0.17 | slight[1] |
| 8 | AP D | 18 | 0.20 | none |
| 9 | AP D | 25 | 0.34 | none |
| 10 | AP D | 32 | 0.20 | none | comp. = comparison example
[1] minor faults at the foam/steel sheet interface (production underside)

In the series of tests with foam system 2, minor faults were found in the foam/steel sheet interface on the production underside after tempering of the composite elements in the reference test without adhesion promoter.

The adhesion value of at least 0.2 N/mm² which is advantageous for standard panel production is achieved with adhesion promoter D in foam system 2 (Examples 8 to 10).

The invention claimed is:

1. A process for producing a foam composite element, comprising the steps of:
    A) providing a facing;
    B) applying adhesion promoter to the facing; and
    C) applying a foam layer comprising polyurethane and/or polyisocyanurate to the adhesion promoter,
    wherein the adhesion promoter consists of at least one compound selected from the group consisting of polyether polyol (B.1), polymer polyol (B.2), polyurea dispersion (B.3), and polyester polyol (B.4), wherein (B.1) is selected from the group consisting of polyoxypropylene polyols, polyoxypropylene-polyoxyethylene polyols and polyether carbonate polyols, and wherein the adhesion between the facing and the foam layer is from ≥0.20 N/mm² to ≤1.00 N/mm².

2. The process of claim 1, wherein the material of the facing comprises aluminium, steel, bitumen, paper, mineral nonwovens, nonwovens comprising organic fibres, plastics sheets, plastics films and/or wood plates.

3. The process of claim 1, wherein the adhesion promoter has a hydroxyl functionality of from 2 to 8.

4. The process of claim 1, wherein the adhesion promoter has a hydroxyl number in the range from 15 to 500.

5. The process of claim 1, wherein the adhesion promoter consists of at least one compound selected from the group consisting of polyether polyol (BA) and polymer polyol (B.2).

6. The process of claim 1, wherein the polymer polyol (B.2) contains from 1 to 45 wt. % fillers, based on the polymer polyol.

7. The process of claim 1, wherein the adhesion promoter is applied to the facing in an amount of from ≥20 g/m2 to ≤50 g/m2.

8. The process of claim 1, wherein the facing is heated to a temperature of from ≥20° C. to ≤70° C. before the adhesion promoter is applied.

9. The process of claim 1, wherein the foam layer is obtained from the reaction of a polyisocyanate and at least one compound selected from the group consisting of reaction mixtures comprising polyester polyols and polyether polyols, wherein the molar ratio of isocyanate groups to hydroxyl groups in the reaction mixture at the start of the reaction is from ≥100:100 to ≤400:100.

10. The process of claim 1, wherein the apparent density of the foam layer is from ≥30 g/l to ≤48 g/l.

11. The process of claim 1, wherein the adhesion promoter consists of a mixture of polyether polyol (B.1) and polymer polyol (B.2) in a ratio of (B.1):(B.2) from 3:1 to 1:3.

* * * * *